Jan. 11, 1966   K. H. WILLIAMSON   3,229,191

PLURAL LOAD INVERTER CIRCUIT

Filed April 10, 1962

United States Patent Office 3,229,191
Patented Jan. 11, 1966

3,229,191
PLURAL LOAD INVERTER CIRCUIT
Keith Harold Williamson, Swaything, Southampton, England, assignor to Rotax Limited, London, England
Filed Apr. 10, 1962, Ser. No. 186,515
Claims priority, application Great Britain, Apr. 17, 1961, 13,697/61
2 Claims. (Cl. 321—45)

This invention relates to circuits employing controlled rectifiers, and of the kind comprising first and second terminals which in use are of relatively positive and negative polarity respectively, first and second controlled rectifiers having their cathodes connected to the second terminal and their anodes connected to the first terminal, first and second loads in series with the first and second controlled rectifiers respectively, and a capacitor connector between a point intermediate the first controlled rectifier and a first load, and a point intermediate the second controlled rectifier and the second load.

With such a circuit the purpose of the second rectifier and second load is to enable the first rectifier to be cut off, when desired, to prevent further current flow through the first load. Thus, whilst the first rectifier is conducting the capacitor charges to the supply voltage, and when the second rectifier is fired the voltage across the capacitor serves to cut off the first rectifier. Similarly, refiring of the first rectifier cuts off the second rectifier.

A disadvantage of this circuit is that whilst the second rectifier conducts the second load is dissipating power, and the object of this invention is to overcome this disadvantage in a convenient manner.

According to the invention, a circuit of the kind specified includes means for permitting current flow through the second load when the second controlled rectifier is conducting only for a period of time sufficient to charge the capacitor to the supply voltage.

Figure 1:
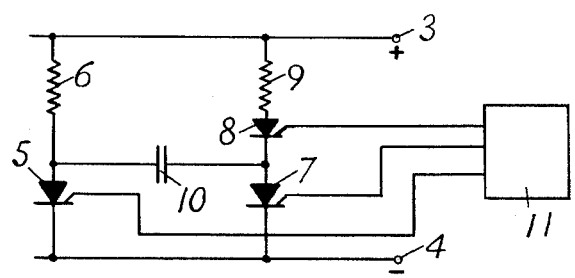
Figure 2:
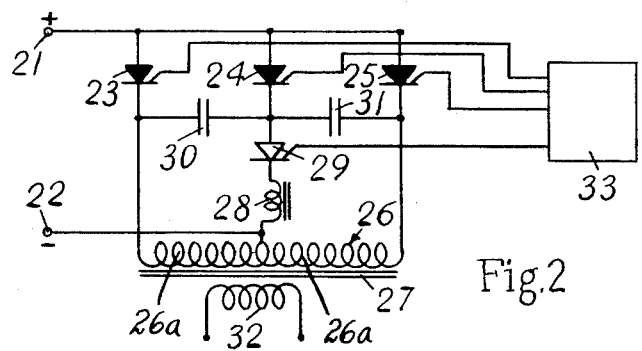

In the accompanying drawings, FIGURE 1 is a circuit diagram illustrating the principle of the invention, and FIGURE 2 illustrates a practical embodiment.

Referring first to FIGURE 1, there are provided first and second terminals 3, 4 adapted for connection to a source of direct or rectified alternating current so as to be of relatively positive and negative polarity in use respectively. Connected to the terminal 4 is the cathode of a first controlled rectifier 5 having its anode connected through a main load 6 to the terminal 3. Also connected to the terminal 4 is the cathode of a second controlled rectifier 7 having its anode connected to the terminal 3 through the cathode and anode of a third controlled rectifier 8 and a load 9 in series. Further, a capacitor 10 is connected between the anodes of the rectifiers 5.

In operation, the controlled rectifiers 5, 8, 7 are fired in that order by any convenient means 11. Assuming that the controlled rectifier 5 has been fired, then current flows through the load 6. The controlled rectifier 8 is now fired and the capacitor is charged substantially to the supply voltage. When the capacitor 10 is charged, no further current flows through the controlled rectifier 8, which is therefore cut off. When the controlled rectifier 7 is fired, the capacitor voltage will be applied across the controlled rectifier 5, thereby ensuring that it is cut off. The capacitor 10 is now charged to the supply voltage in the opposite direction, and once it is charged current flow through the controlled rectifier 7 ceases. Refiring of the controlled rectifier 5 now recommences the cycle.

With the circuit described above there is the possibility that the controlled rectifiers 8, 7 will not be completely cut off when the capacitor is charged. However, the possibility of the controlled rectifier 8 continuing to conduct can be minimized by using a load 9 of an inductive nature, which causes the capacitor to be charged to a voltage in excess of that of the supply voltage, so that the controlled rectifier 8 is positively cut off by the voltage across the capacitor when the latter is charged. If the load 6 is inductive, similar considerations apply to the controlled rectifier 7.

The principle explained with reference to FIGURE 1 can be put into practice as shown in FIGURE 2, in which there is shown an example as applied to an inverter for producing a single phase A.C. output. Referring to FIGURE 2, there are provided first and second terminals 21, 22 arranged to be of positive and negative polarity as before. Connected to the terminal 21 are the anodes of first, second and third controlled rectifiers 23, 24, 25. The controlled rectifiers 23, 25 have their cathodes connected to the terminal 22 through portions 26a, 26b at opposite sides of the mid-point of the primary winding 26 of a transformer 27. The mid-point of the winding 26 is connected through a load 28 and the cathode and anode of a fourth controlled rectifier 29 to the cathode of the controlled rectifier 24. Further, the cathodes of the controlled rectifiers 23, 24 are connected through a capacitor 30, and the cathodes of the controlled rectifiers 24, 25 are connected through a capacitor 31. The output is taken from a secondary winding 32 of the transformer.

It will be understood that in FIGURE 1 the loads 6, 9 could be in the cathode circuits of the rectifiers 5, 7, in which case the capacitor 10 is connected between the cathodes of the rectifiers 5, 7, and the rectifier 8 is re-positioned so as to be in the charging path of the capacitor 10 when the rectifier 5 is conducting. Such re-positioning of the loads is shown in FIGURE 2, which actually represents the equivalent of two circuits each equivalent to the circuit shown in FIGURE 1. In one circuit, the components 5, 6, 7, 8, 9, 10 shown in FIGURE 1 are represented by components 23, 26a, 24, 29, 28, 30 respectively in FIGURE 2. In the other circuit in FIGURE 2 the components 5, 6, 7, 8, 9, 10 in FIGURE 1 are represented by components 25, 26b, 24, 29, 28, 31 respectively. Thus the components 24, 28, 29 are common to the two circuits shown in FIGURE 2. The two circuits are operated in turn in the same way as the circuit in FIGURE 1 by firing the controlled rectifiers in the order 23, 29, 24, 25, 29, 24, 23. Firing of 23, 29, 24 operates the first circuit and current flows in portion 26a from left to right. Firing of 25, 29, 24 operates the second circuit and current flows in portion 26b from right to left. An A.C. output is thus obtained in winding 32.

Having thus described my invention what I claim as new and desire to secure by Letters Patent is:

1. An inverter comprising in combination first and second terminals for connection to a D.C. source, a transformer having a secondary winding in which the required A.C. output is produced and a primary winding, means connecting the mid-point of said primary winding to the first terminal, first and second controlled rectifiers through which the ends of the primary winding respectively are connected to the second terminal, a third controlled rectifier, a fourth controlled rectifier and an inductive load connected in series between said terminals, a first capacitor connected to the second terminal through the first controlled rectifier and connected to the first terminal through the fourth controlled rectifier and the inductive loads in series, a second capacitor connected to the second terminal through the second controlled rectifier and connected to the first terminal through the fourth controlled rectifier and the inductive load in series, and means for rendering the first, fourth, third, second, fourth, third controlled rectifiers conductive in that order.

2. An inverter comprising in combination first and second terminals for connection to a D.C. source so as to be of negative and positive polarity respectively, a transformer having a secondary winding in which the required A.C. output is produced and a primary winding, means connecting the mid-point of said primary winding to the first terminal, a first controlled rectifier having its cathode connected to one end of said primary winding and its anode connected to said second terminal, a second controlled rectifier having its cathode connected to the other end of said primary winding and its anode connected to the second terminal, a third controlled rectifier having its anode connected to the second terminal, a fourth controlled rectifier and an inductive load connected in series between the cathode of the third controlled rectifier and the first terminal, a first capacitor connected between the cathodes of the first and third controlled rectifiers, a second capacitor connected between the cathodes of the second and third controlled rectifiers, and means for firing the first, fourth, third, second, fourth, third controlled rectifiers in that order.

References Cited by the Examiner
UNITED STATES PATENTS 3,008,068 11/1961 Wilting et al. _____ 321—45
3,075,136 1/1963 Jones _____ 321—45

LLOYD McCOLLUM, *Primary Examiner.*

LARRY R. CASSETT, *Examiner.*

MICHAEL L. WACHTELL, *Assistant Examiner.*